United States Patent [19]

Heller

[11] Patent Number: 4,741,607

[45] Date of Patent: May 3, 1988

[54] SUPPORTING DEVICE FOR AN OPTICAL OBSERVATION INSTRUMENT

[75] Inventor: Rudolf Heller, Zürich, Switzerland

[73] Assignee: Contraves AG, Zürich, Switzerland

[21] Appl. No.: 24,673

[22] Filed: Mar. 11, 1987

[30] Foreign Application Priority Data

Mar. 17, 1986 [CH] Switzerland .................. 01069/86

[51] Int. Cl.⁴ .................. B02B 21/00; A47G 29/00
[52] U.S. Cl. .................. 350/522; 248/123.1; 248/280.1
[58] Field of Search .................. 350/522, 321; 248/123.1, 280.1, 364, 542

[56] References Cited

U.S. PATENT DOCUMENTS

| | | | |
|---|---|---|---|
| 3,762,796 | 10/1973 | Heller | 350/522 |
| 3,891,301 | 6/1975 | Heller | 350/522 |
| 4,344,595 | 8/1982 | Heller et al. | 248/280.1 |
| 4,684,088 | 8/1987 | Heller | 248/123.1 |

FOREIGN PATENT DOCUMENTS 23003  1/1981  European Pat. Off. ......... 248/280.1

Primary Examiner—William H. Punter
Attorney, Agent, or Firm—Werner W. Kleeman

[57] ABSTRACT

The supporting device is constructed as a support stand and contains an upright, a first pivot system pivotably mounted at the upright, a second pivot system rotatably and pivotably mounted at the first pivot system, as well as adjustable counterweights and several pivotable and lockable pivot bearings permitting rotary and pivoting movements. The upright has a substantially U-shaped cross-section containing two side members between which there are arranged, in a space-saving manner, a pivot arm which is pivotably mounted about a substantially horizontal axis, and an L-shaped control lever mounted at the pivot arm and receiving a first counterweight. The second pivot system is arranged at the first pivot system using an L-shaped support arm and is constructed such that the extended horizontal axis of a top lockable pivot bearing intersects with the rotary and pivot axis of a front lockable pivot bearing.

4 Claims, 1 Drawing Sheet

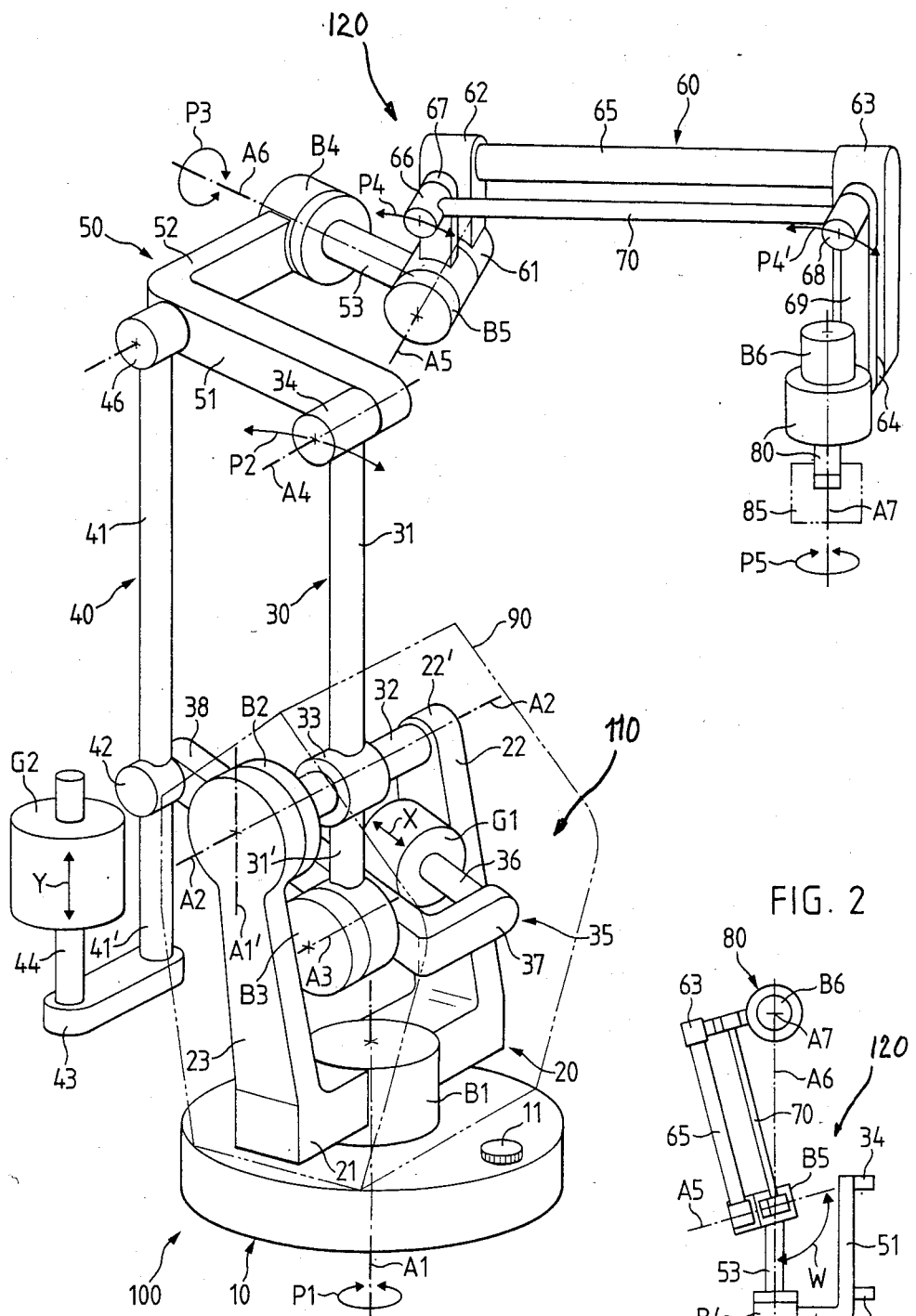
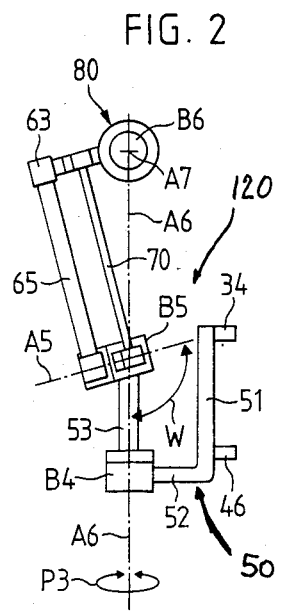
FIG. 1
FIG. 2

SUPPORTING DEVICE FOR AN OPTICAL OBSERVATION INSTRUMENT

BACKGROUND OF THE INVENTION

The present invention relates to a new and improved construction of a supporting device for an optical observation instrument, particularly for a surgical microscope which can be locked with respect to its position and orientation in a predetermined spatial range.

In its more particular aspects, the present invention relates to a new and improved construction of a supporting device for an optical observation instrument, particularly for a surgical microscope which can be locked with respect to its position and orientation in a predetermined spatial range, and which supporting device substantially encompasses an upright, a first pivot system which is pivotably mounted at the upright and formed by a predetermined number of members, and a second pivot system for the optical instrument. The second pivot system is rotatably mounted at the first pivot system and contains a predetermined number of members. The rotary and pivot movements of the first pivot system and of the second pivot system can be counterbalanced and locked by means of adjustable counterweights and a predetermined number of lockable pivot bearings or supports.

A supporting device for an optical instrument, particularly a surgical microscope such as known, for example, from European Pat. No. 0,023,003 and German Pat. No. 2,320,266, is constructed as a support stand which is precisely adjustable to each site within a predetermined spatial range. These known supporting devices essentially encompass an upright, a pivot or swivel arm laterally mounted thereat and a support arm arranged at a free top end of the pivot or swivel arm. There are further correspondingly arranged counterweights and several lockable pivot bearings or supports for balancing the pivoting and rotary movements of the individual components. The swing-out and rotary movements of the different pivot or swivel arms and support arms require a relatively large amount of space.

SUMMARY OF THE INVENTION

Therefore, with the foregoing in mind, it is a primary object of the present invention to provide a new and improved construction of a supporting device for an optical observation instrument and which supporting device does not exhibit the aforementioned drawbacks and shortcomings of the prior art constructions.

A further more specific object of the present invention is directed to providing a new and improved construction of a supporting device for an optical observation instrument and which supporting device contains a space-saving and weight-saving arrangement of the individual supporting and weight-balancing elements without affecting the operative range covered by the components of such supporting device.

A still further important object of the present invention is directed to providing a new and improved construction of a supporting device for an optical observation instrument and which supporting device contains a constructionally simplified support arm supporting the optical instrument and yet retains readily operable or user-friendly adjusting means without affecting the operative range of movements of the optical instrument.

Yet a further significant object of the present invention aims at providing a new and improved construction of a supporting device for an optical observation instrument and which supporting device is relatively simple in construction and design, extremely economic to manufacture, highly reliable in operation, not readily subject to breakdown or malfunction and requires a minimum of maintenance and servicing.

Now in order to implement these and still further objects of the invention which will become more readily apparent as the description proceeds, the supporting device of the present development is manifested by the features that, the upright is rotatable about a first substantially vertical axis and possesses a substantially U-shaped cross-section having two substantially vertical upright side members. A pivot arm of the first pivot system which is pivotable about a substantially horizontal axis and a control lever which is operatively connected to the pivot arm and to a thrust rod which is constructed to receive a second counterweight, are arranged between the two substantially vertical upright side members. A substantially L-shaped support arm for receiving the second pivot system, is arranged at a top portion of the pivot arm and at a top portion of the thrust rod of the first pivot system. The first pivot system can be locked with respect to the upright and the second pivot system can be locked with respect to the first pivot system in a manner which is known as such.

BRIEF DESCRIPTION OF THE DRAWINGS

The invention will be better understood and objects other than those set forth above will become apparent when consideration is given to the following detailed description thereof. Such description makes reference to the annexed drawing wherein throughout the various figures of the drawings, there have been generally used the same reference characters to denote the same or analogous components and wherein:

FIG. 1 is a perspective view of an exemplary embodiment of the inventive supporting device; and FIG. 2 is a schematic top plan view at a reduced scale of the top or second pivot system in the supporting device shown in FIG. 1.

DETAILED DESCRIPTION OF THE PREFERRED EMBODIMENTS

Describing now the drawings, it is to be understood that to simplify the showing thereof, only enough of the structure of the supporting device has been illustrated therein as is needed to enable one skilled in the art to readily understand the underlying principles and concepts of the present invention. Turning now specifically to FIG. 1 of the drawings, the structure illustrated therein by way of example and not limitation, will be seen to comprise a supporting device 100 for an optical observation instrument. The supporting device 100, for example, is constructed as a floor mounted stand supporting as the optical observation instrument, for instance a surgical microscope 85 which is freely movable in a predetermined spatial range with respect to its position and orientation and can be locked in any desired position.

The supporting device 100 essentially encompasses a stand base 10, an upright 20, a pivot arm 30, a control lever 35, a thrust rod 40, a substantially L-shaped support arm 50 and a multi-part support linkage 60 having a front end which is constructed for receiving and freely movable mounting the schematically illustrated surgical microscope 85.

In the supporting device 100 shown in FIG. 1, the members 30, 35 and 40 and further members individually arranged or operatively connected to such members 30, 35 and 40, form a first pivot system 110. The members 50, 60 and 70 which are arranged at respective top portions or sections 31 and 41 of the members 30 and 40, form a second pivot system 120 conjointly with further members which are individually arranged or operatively connected to such members 50, 60 and 70.

In order to, for example, manually move the surgical microscope 85 into a desired position and for locking the same in such position, there are provided, for rotary and pivoting movements about respective substantially vertical and substantially horizontal axes A1, A2, A3, A4, A5, A6 and A7, respective magnetically operating lockable or blockable pivot bearings or supports of a construction which is known as such.

The release of the lockable pivot bearings or supports B1 to B6 by operating a not particularly illustrated electric switch which is, for example, arranged at the surgical microscope 85, permits altering the position and orientation of the surgical microscope 85 in a manner which is known as such and requires only little force. The aforementioned members 10, 20, 30, 35, 40, 50 and 60 which are operatively connected with the lockable pivot bearings or supports B1 to B6 for rotation and pivoting about the related axes A1 to A7, will be described hereinafter.

The stand base 10 preferably is mounted on not illustrated rolls so that the supporting device 100 forms a structural unit and is mobile and can be levelled and fixed on the floor by means of schematically illustrated elements 11 which are arranged at the stand base 10.

The upright 20 is substantially U-shaped and has a base support member 21 containing a lockable pivot bearing or support B1 which preferably is integrated into the base support member 21, as well as two side members 22 and 23 which are arranged in a spaced relationship and extend substantially perpendicular relative to the base support member 21. In the top portion of the upright 20, a lockable pivot bearing or support B2 is integrated into one side member, namely the side member 23. A bearing or support 22' is provided in the other side member 22. A shaft body 32 defines a substantially horizontal axis A2 and a second substantially vertical axis A1' and is mounted at the lockable pivot bearing or support B2 and the bearing or support 22'. The shaft body 32 defining the substantially horizontal axis A2 and the second substantially vertical axis A1', is positioned in a spaced relationship substantially parallel to a first substantially vertical axis A1 defined by the upright 20. The upright 20 is supported by means of the base support member 21 and the lockable pivot bearing or support B1 at and in the stand base 10 and can be rotated in the direction of the double-headed arrow P1 about the first substantially vertical axis A1.

The pivot arm 30 is formed by a first or top portion 31 and a second or bottom portion 31' and is arranged, by means of a pivot bearing or support 33 which interconnects the first and second portions 31 and 31', between the two side members 22 and 23 of the upright 20. The pivot arm 30 is pivotable conjointly with the shaft body 32 about the substantially horizontal axis A2, which is defined by the lockable pivot bearing or support B2, in the direction of the double-headed arrow P2. A bearing or support 34 is arranged at the first or top portion 31 of the pivot arm 30 and operatively connected to the substantially L-shaped support arm 50 of the second pivot system 120. A lockable pivot bearing or support B3 is arranged at the second or bottom portion 31' of the pivot arm 30. This lockable pivot bearing or support B3 essentially defines an axis A3 and is operatively connected with the control lever 35.

The thrust rod 40 is formed by a first or top portion 41 and a second or bottom portion 41' and is oriented substantially parallel to the pivot arm 30. The thrust rod 40 is operatively connected to the control lever 35 by means of a pivot bearing 42 which interconnects the first and second portions 41 and 41' of the thrust rod 40. A bracket 43 and a rod 44, which is arranged substantially parallel to the second or bottom portion 41', are mounted at such second or bottom portion 41'. A second counterweight G2, which is fixable in position, is arranged on the rod 44 and continuously adjustable in the direction of the double-headed arrow Y using conventional and therefore particularly not shown electrical or manual adjustable means. A pivot bearing or support 46 is provided at the first or top portion 41 of the thrust rod 40 and also is operatively connected to the substantially L-shaped support arm 50 of the second pivot system 120.

The substantially L-shaped control lever 35 which is arranged between the two side members 22, 23 of the upright 20, is operatively connected to the pivot bearing or support 42 of the thrust rod 40 and the lockable pivot bearing or support B3 of the pivot arm 30 by means of a first or long leg portion of such substantially L-shaped control lever 35. A second or short leg portion 37 of the substantially L-shaped control lever 35 is constructed as a bracket and provided with a rod 36 which is oriented substantially parallel to the aforementioned first or long leg portion 38. A first counterweight G1, which is continuously adjustable in the direction of the double-headed arrow X, is arranged at the rod 36.

The one-piece, substantially L-shaped support arm 50 of the second pivot system 120 is arranged and supported at the first pivot system 110 by means of the pivot bearing 34 of the pivot arm 30 and the pivot bearing 46 of the thrust rod 40 by utilizing a first or longer leg portion 51 of such substantially L-shaped support arm 50. A top lockable pivot bearing or support B4 is arranged and mounted at a second or shorter leg portion 52 of the substantially L-shaped support arm 50 and which second or shorter leg portion 52 is constructed as a bracket. A further tubular support arm 53 is supported substantially in axial direction in the top lockable pivot bearing or support B4. A further lockable pivot bearing or support B5 is oriented substantially transversely relative to the top lockable pivot bearing or support B4 and is arranged and fixed at a free end of the tubular support arm 53.

The support linkage 60 essentially contains a support arm 65, a guide member 70 and a plural number of individual members 61, 62, 63, 64, 65, 66, 67, 68 and 69. The support linkage 60 can be rotated about an axis A6 defined by the top lockable pivot bearing or support B4 in the direction of the double-headed arrow P3 together with the surgical microscope 85 which is mounted at a front end of a head and coupling member 80. The guide member 70 forms a linkage containing the individual members 67, 66 and 69, 68 and is pivotable relative to the support arm 65 in the direction of the double-headed arrows P4 and P4' about a substantially horizontally oriented axis A5 defined by the further lockable pivot bearing or support B5. The support arm 65 which may be manufactured, for example, from a tube, in the support linkage 60 has a first end which is arranged in a first bearing or support block 62, and a second end which is arranged in a second bearing or support block 63. The first bearing or support block 62 is arranged at a bearing or support member 61 which, in turn, is arranged at the further lockable pivot bearing or support B5. The lower region of the second bearing or support block 63 possesses an only partially illustrated bearing or support member 64 which is operatively connected with the head and coupling member 80 and a web 69 of the guide member 70.

The guide member 70 is manufactured as a rod or tube from a suitably selected light metal and is provided at a first end with a first bearing or support element or member 66 which is supported at a web 67 fixed to the further lockable pivot bearing or support B5. A second bearing or support element 68 is arranged at a second end of the guide member 70 and at the web 69 provided for mounting the head and coupling member 80. The guide member 70 is operatively connected at its first end to the further lockable pivot bearing or support member B5 by means of the members 67 and 66 and at its second end to the head and coupling member 80 by means of the members 68 and 69. The guide member 70 is pivotable relative to the support linkage 60 substantially about the horizontal axis A5 in the direction of the double-headed arrows P4 and P4'.

The surgical microscope 85 is attached to the head and coupling member 80 and can be fixed in its center of gravity position in known manner using a conventional and therefore not particularly illustrated ball and socket joint. The surgical microscope 85 can be rotated about the substantially vertically oriented rotational and pivot axis A7 in the direction of the double-headed arrow P5.

FIG. 2 is a schematically illustrated top plan view of the second or top pivot system 120. There will be recognized the substantially L-shaped support arm 50 which is arranged and supported at the pivot bearings 34 and 46 of the first pivot system 110. Such pivot bearings 34 and 46 are arranged at the longer leg portion 51 of the substantially L-shaped support arm 50. There will also be recognized the top lockable pivot bearing or support B4 which is arranged at the shorter leg portion 52 of the substantially L-shaped support arm 50. At this top lockable pivot bearing or support B4 there is supported for rotation in the direction of the arrow P3, one end of the tubular support arm 53. At the free end of the tubular support arm 53, there is arranged the further lockable bearing or support B5. The substantially horizontal axis A5 defined by such further lockable pivot bearing or support B5 extends at an angle W relative to the extended axis A6 defined by the top lockable pivot bearing or support B4. The angle W is selected such that the extended axis A6 substantially intersects with the substantially vertical rotational and pivot axis A7 defined by the front lockable pivot bearing or support B6. FIG. 2 also shows the support arm 65, the guide member 70, and the head and coupling member 80.

The bearings or supports B1, B2, B3, B4, B5 and B6 which are arranged at associated joints of the supporting device 100, are constructed in a manner known as such and as lockable pivot bearings or supports. Each individual lockable bearing or support is manually adjustable such that the lockable pivot bearings or supports can be adjusted in any desired manner for effecting rotary and/or pivoting movements or adjustments of the individual components or members.

It is pointed out at this point that the upright 20 shown in FIG. 1 can be encased by a correspondingly constructed housing or casing 90 which is only schematically indicated by dash-dotted lines and which is adapted to permit the required rotary and pivoting movements.

While there are shown and described present preferred embodiments of the invention, it is to be distinctly understood that the invention is not limited thereto, but may be otherwise variously embodied and practiced within the scope of the following claims. Accordingly,

What I claim is:

1. A supporting device for an optical observation instrument, particularly for a stationary surgical microscope which can be locked with respect to its position and orientation in a predetermined spatial range, comprising:
    an upright;
    a first pivot system;
    said first pivot system being pivotably mounted at said upright;
    a second pivot system;
    said second pivot system being rotatably and pivotably mounted at said first pivot system;
    a predetermined number of adjustable counterweights and a predetermined number of lockable pivot bearings for respectively counterbalancing and locking rotational and pivoting movements of the first pivot system and the second pivot system;
    said upright being rotatable about a first substantially vertical axis;
    said upright having a substantially U-shaped cross-section and containing two substantially vertical upright side members;
    said first pivot system contains a pivot arm pivotable about a predetermined substantially horizontal axis;
    said first pivot system further containing a control lever operatively connected to said pivot arm;
    said predetermined number of adjustable counterweights comprising a first counterweight;
    said pivot arm, said control lever and said first counterweight being arranged intermediate said two substantially vertical upright side members;
    said predetermined number of adjustable counterweights comprising a second counterweight;
    said first pivot system still further containing a thrust rod for receiving said second counterweight;
    said control lever being operatively connected to said thrust rod;
    said pivot arm containing a top portion;
    said thrust rod containing a top portion;
    said second pivot system containing a substantially L-shaped support arm supporting said second pivot system;
    said substantially L-shaped support arm being arranged at said top portion of said pivot arm and at said top portion of said thrust rod;
    said first pivot system being lockable with respect to said upright by predeterminate ones of said predetermined number of lockable pivot bearings; and
    said second pivot system being lockable with respect to said first pivot system by predeterminate ones of said predetermined number of lockable pivot bearings.

2. The supporting device as defined in claim 1, wherein:

said pivot arm of said first pivot system contains a bottom portion;

one of said predetermined lockable pivot bearing being arranged at said bottom portion of said pivot arm;

said one lockable pivot bearing being arranged intermediate said two substantially vertical upright side members;

said control lever defining a substantially L-shaped control lever;

said substantially L-shaped control lever being operatively connected to said one lockable pivot bearing;

said substantially L-shaped control lever containing a short leg portion and a long leg portion;

a rod for supporting said first counterweight; and said rod being arranged at said short leg portion of said substantially L-shaped control lever and extending substantially parallel to said long leg portion of said substantially L-shaped control lever.

3. The supporting device as defined in claim 1, wherein:

said pivot arm of said first pivot system defining a second substantially vertical axis extending substantially perpendicular to said predetermined substantially horizontal axis; and said second substantially vertical axis extending elevationally offset and in a spaced relationship substantially parallel to said first substantially vertical axis about which said upright is rotatable.

4. The supporting device as defined in claim 1, wherein:

said predetermined number of lockable pivot bearings comprise a top lockable pivot bearing connected to said substantially L-shaped support arm which supports said second pivot system and is arranged at said top portion of said pivot arm of said first pivot system and at said top portion of said thrust rod of said first pivot system;

said second pivot system comprising a further support arm arranged in said top lockable support;

said predetermined number of lockable pivot bearings comprising a further lockable pivot bearing extending substantially transversely relative to said top lockable pivot bearing and mounted at said further support arm;

said further lockable pivot bearing defining a further substantially horizontal axis;

said top lockable pivot bearing defining an axis;

said predetermined number of lockable pivot bearings comprising a front lockable pivot bearing interconnecting said surgical microscope and said second pivot system;

said front lockable pivot bearing defining a rotational and pivot axis; and said further support arm arranged in said top lockable pivot bearing and said further substantially horizontal axis defined by said further lockable pivot bearing being arranged at an angle relative to each other such that an extended axis of said axis defined by said top lockable pivot bearing intersects with said rotational and pivot axis defined by said front lockable pivot bearing.

* * * * *